United States Patent
Watanabe et al.

(10) Patent No.: US 11,472,369 B2
(45) Date of Patent: Oct. 18, 2022

(54) ANCHOR DEVICE

(71) Applicant: KABUSHIKI KAISHA TOKAI-RIKA-DENKI-SEISAKUSHO, Aichi-ken (JP)

(72) Inventors: Yuki Watanabe, Aichi-ken (JP); Masakazu Kumazawa, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 120 days.

(21) Appl. No.: 17/014,854

(22) Filed: Sep. 8, 2020

(65) Prior Publication Data

US 2021/0078526 A1    Mar. 18, 2021

(30) Foreign Application Priority Data

Sep. 13, 2019    (JP) .............................. JP2019-167650

(51) Int. Cl.
*B60R 22/24*    (2006.01)
*A44B 11/25*    (2006.01)

(52) U.S. Cl.
CPC .............. *B60R 22/24* (2013.01); *A44B 11/25* (2013.01)

(58) Field of Classification Search
CPC ..................................................... B60R 22/24
See application file for complete search history.

(56) References Cited

U.S. PATENT DOCUMENTS

| 7,413,371 | B2* | 8/2008 | Arnold | B60R 22/18 |
| | | | | 403/329 |
| 9,308,889 | B1* | 4/2016 | Denninger | B60R 22/19 |
| 9,814,282 | B2* | 11/2017 | Merrick | A44B 11/2523 |
| 2007/0132224 | A1* | 6/2007 | Hall | B60R 22/24 |
| | | | | 280/808 |
| 2019/0366974 | A1* | 12/2019 | Suminaka | B60R 22/24 |
| 2021/0128374 | A1* | 5/2021 | Esteireiro | B60R 22/30 |

FOREIGN PATENT DOCUMENTS

| DE | 102019113310 A1 | * | 11/2019 | ............ B60R 22/24 |
| EP | 1798122 A1 | * | 6/2007 | ............ B60R 22/18 |
| JP | 3934273 B2 | * | 6/2007 | |
| JP | 2018127031 A | * | 8/2018 | |
| JP | 2018-144541 A | | 9/2018 | |
| JP | 2019006204 A | * | 1/2019 | |
| JP | 2019048561 A | * | 3/2019 | |
| JP | 2020152271 A | * | 9/2020 | |
| JP | 2021046201 A | * | 3/2021 | |
| WO | WO-2020189640 A1 | * | 9/2020 | |

* cited by examiner

*Primary Examiner* — Nicole T Verley
(74) *Attorney, Agent, or Firm* — Calderon Safran & Cole P.C.

(57) ABSTRACT

An anchor device including: a first member that is coupled to one out of a vehicle body side or a webbing side; a second member that is coupled to the other out of the vehicle body side or the webbing side, and that is retained by the first member by being passed through the first member and being moved with respect to the first member; and an abutting portion that is provided to the first member and is configured to ride up onto the second member with a position where the second member abuts the abutting portion displaced in a movement-width direction of the second member and in the opposite direction to a movement direction of the second member when the second member is moved with respect to the first member.

13 Claims, 9 Drawing Sheets

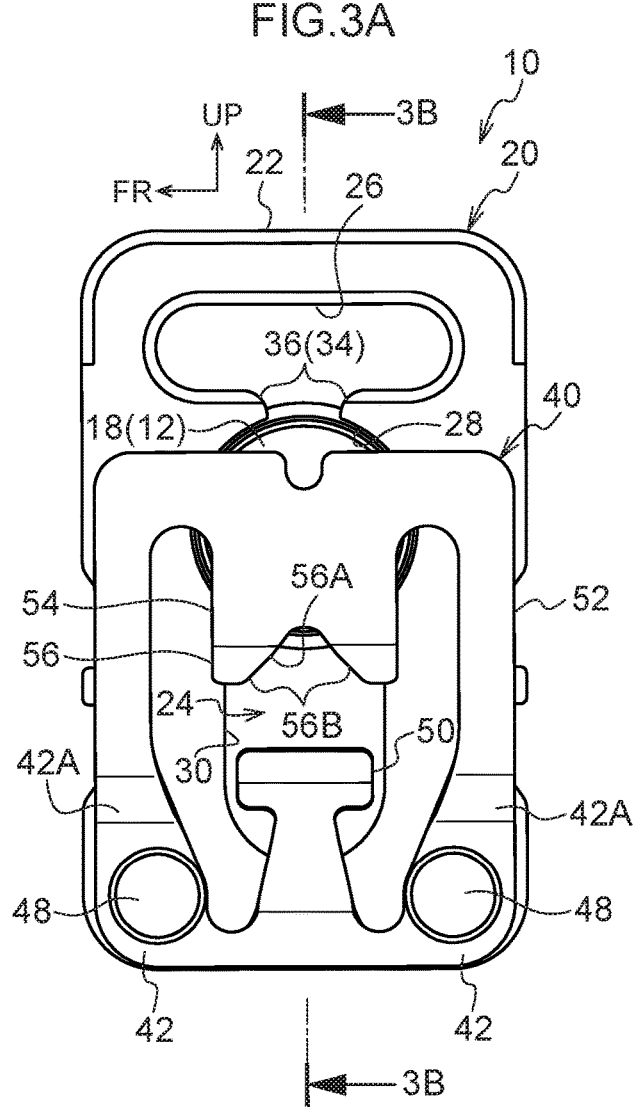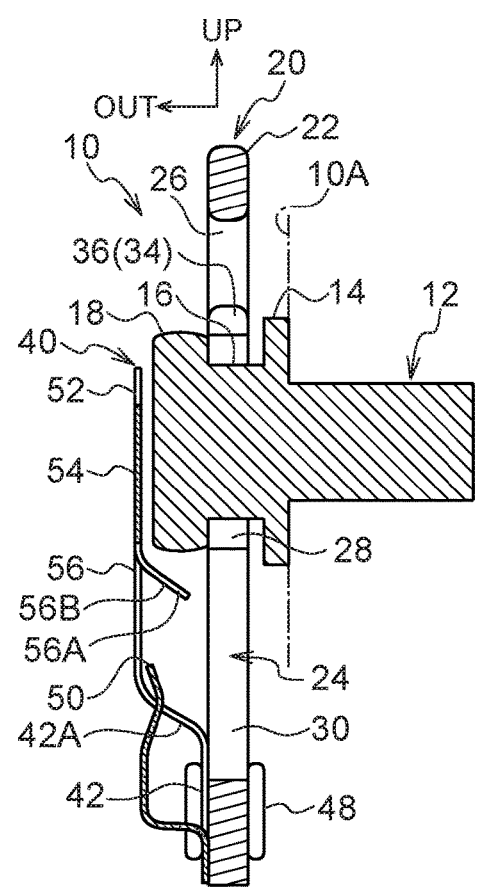

FIG.7A
FIG.7B
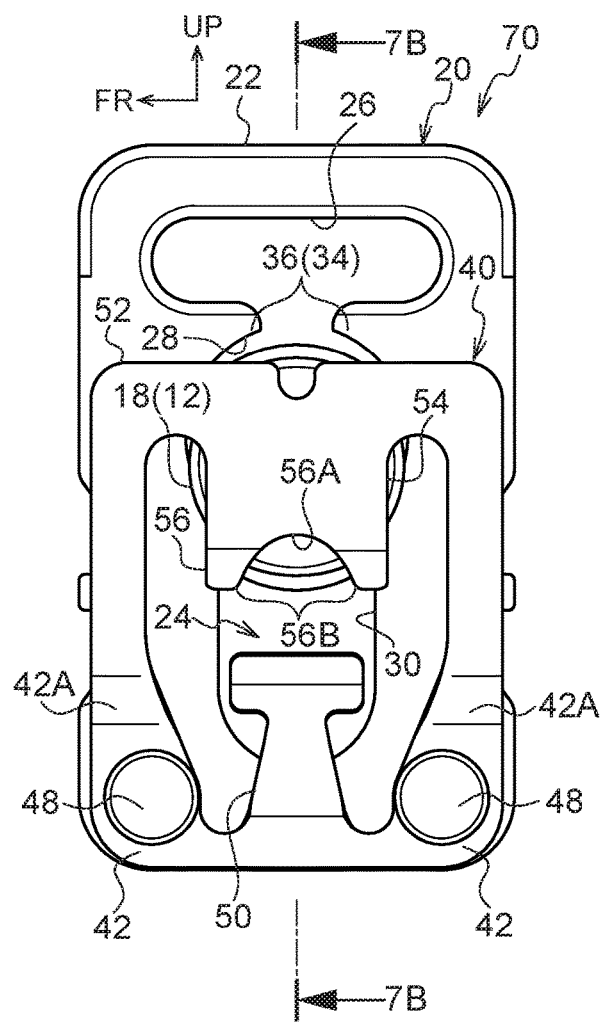
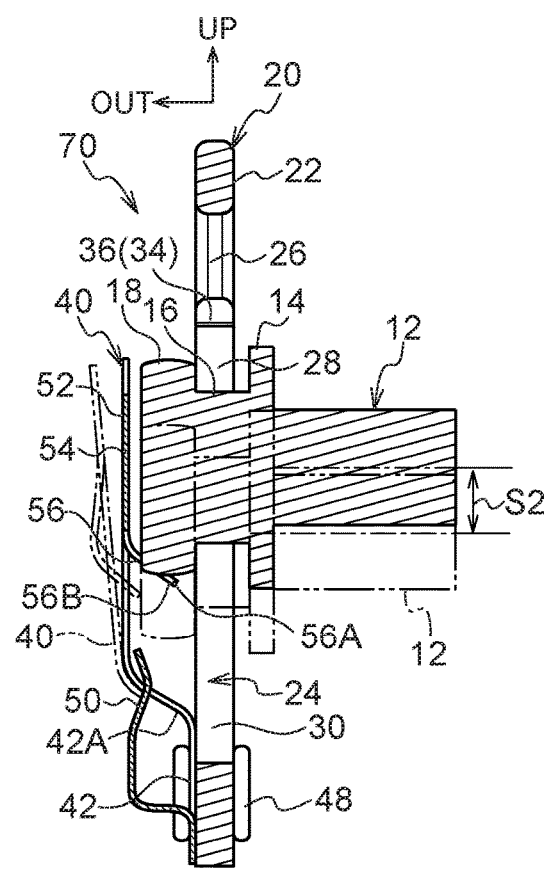

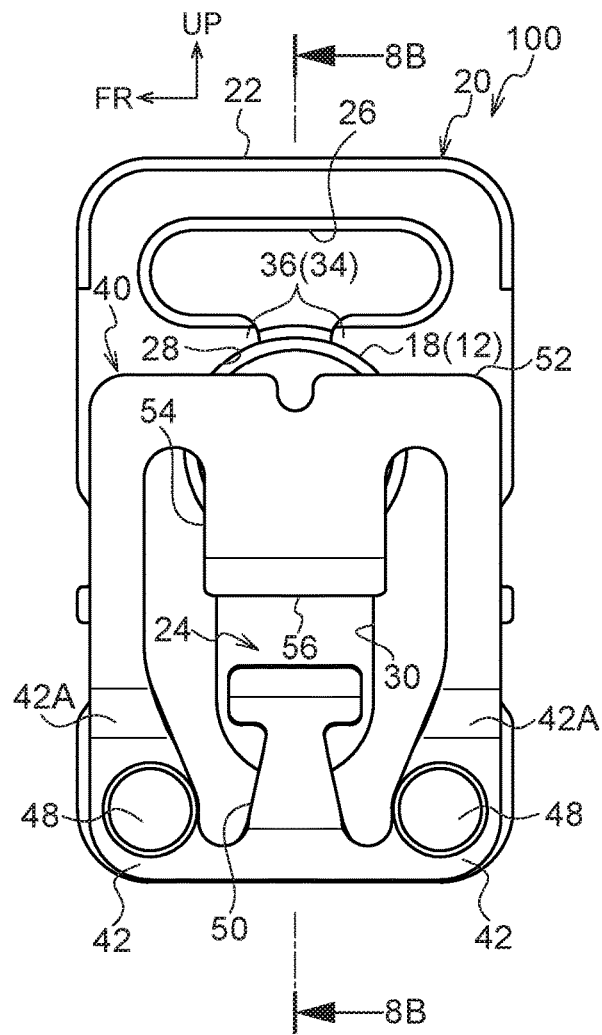
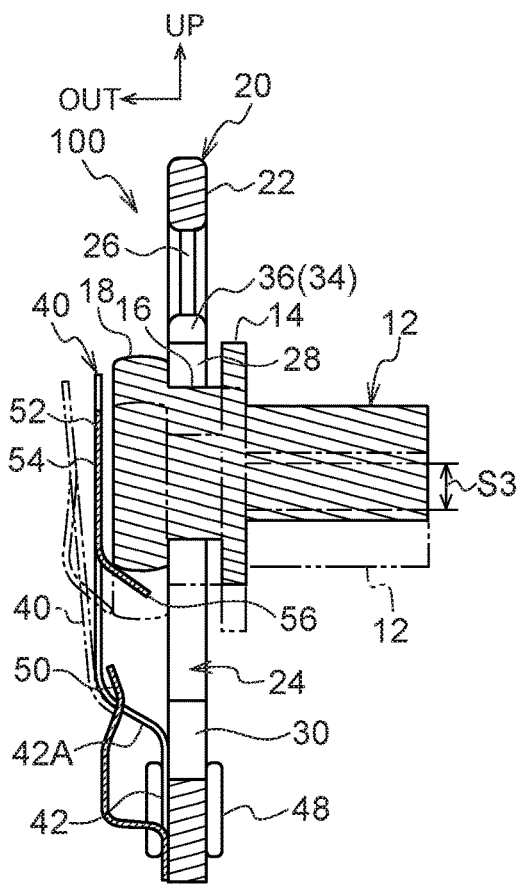
FIG.8A
FIG.8B

ANCHOR DEVICE

CROSS-REFERENCE TO RELATED APPLICATION

This application is based on and claims priority under 35 USC 119 from Japanese Patent Application No. 2019-167650 filed on Sep. 13, 2019, the disclosure of which is incorporated by reference herein.

BACKGROUND

Technical Field

The present disclosure relates to an anchor device that couples a vehicle body side and a webbing side together.

Related Art

In an anchor device disclosed in Japanese Patent Application Laid-Open (JP-A) No. 2018-144541, a stud is made to penetrate a second opening in an anchor plate and is moved with respect to the anchor plate in order to retain the stud in the anchor plate.

In this anchor device, an anchor tab of the anchor plate rides up onto the stud when the stud is moved relative to the anchor plate.

SUMMARY

In consideration of the above circumstances, an object of the present disclosure is to provide an anchor device capable of reducing a load required to cause an abutting portion of a first member to ride up onto a second member.

An anchor device of a first aspect of the present disclosure includes a first member that is coupled to one out of a vehicle body side or a webbing side, a second member that is coupled to the other out of the vehicle body side or the webbing side, and that is retained by the first member by being passed through the first member and being moved with respect to the first member, and an abutting portion that is provided to the first member and is configured to ride up onto the second member with a position where the second member abuts the abutting portion displaced in a movement-width direction of the second member and in the opposite direction to a movement direction of the second member when the second member is moved with respect to the first member.

An anchor device of a second aspect of the present disclosure is the anchor device of the first aspect of the present disclosure, wherein the abutting portion is provided on both movement-width direction sides of the second member.

An anchor device of a third aspect of the present disclosure is the anchor device of the first aspect or the second aspect of the present disclosure, wherein the abutting portion is disposed at a side of the second member in the movement-width direction of the second member when the second member is retained by the first member.

Advantageous Effects of Disclosure

In the anchor device of the first aspect of the present disclosure, the first member is coupled to one out of the vehicle body side or the webbing side, and the second member is coupled to the other out of the vehicle body side or the webbing side. The second member is passed through the first member and moved with respect to the first member so as to retain the second member on the first member.

The first member is provided with the abutting portion, and the position where the second member abuts the abutting portion when the second member is moved with respect to the first member and the abutting portion rides up onto the second member is displaced in the movement-width direction of the second member and in the opposite direction to the movement direction of the second member. This enables a movement stroke of the second member with respect to the first member over which the abutting portion rides up onto the second member to be lengthened, and enables the load required to cause the abutting portion to ride up onto the second member to be reduced.

In the anchor device of the second aspect of the present disclosure, the abutting portion is provided on both movement-width direction sides of the second member. This enables the pair of abutting portions to be suppressed from undergoing relative displacement in the movement-width direction of the second member when the second member is moved with respect to the first member.

In the anchor device of the third aspect of the present disclosure, the abutting portion is disposed at a side of the second member in the movement-width direction of the second member when the second member is retained by the first member. This enables a movement stroke of the second member with respect to the first member in order to retain the second member on the first member to be shortened.

BRIEF DESCRIPTION OF THE DRAWINGS

Exemplary embodiments of the present disclosure will be described in detail based on the following figures, wherein:

FIG. 3A and FIG. 3B are diagrams illustrating an anchor device according to an exemplary embodiment of the present disclosure when an attachment pin is disposed at an inserted position in a plate body, FIG. 3A being a front face view, and FIG. 3B being a cross-section sectioned along line 3B-3B in FIG. 3A;

FIG. 7A and FIG. 7B are diagrams illustrating an anchor device according to a modified example of an exemplary embodiment of the present disclosure when an attachment pin is being moved to a semi-retained position in a plate body, FIG. 7A being a front face view, and FIG. 7B being a cross-section sectioned along line 7B-7B in FIG. 7A;

FIG. 8A and FIG. 8B are diagrams illustrating an anchor device according to a comparative example when an attachment pin is being moved to a semi-retained position in a plate body, FIG. 8A being a front face view, and FIG. 8B being a cross-section sectioned along line 8B-8B in FIG. 8A.

DETAILED DESCRIPTION

Figure 1:
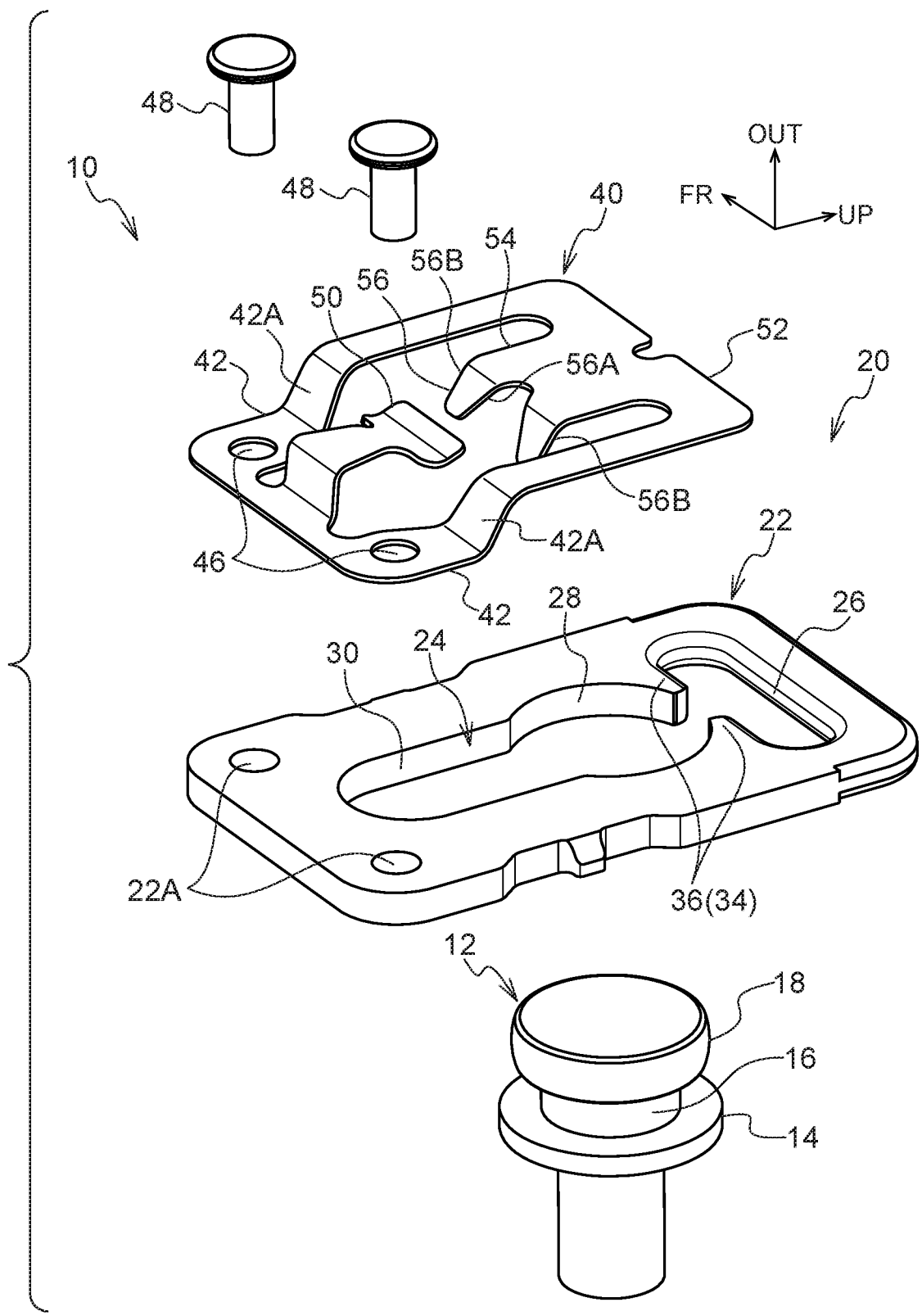
FIG. 1 is an exploded perspective view of an anchor device according to an exemplary embodiment of the present disclosure.
Figure 5A:
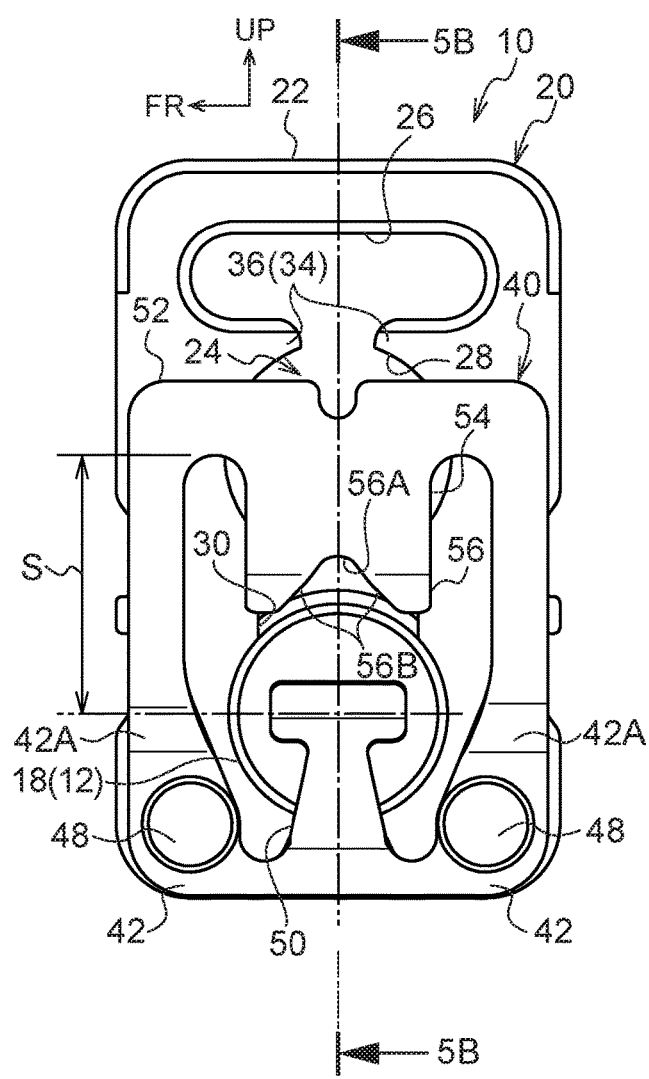
FIG. 5A and FIG. 5B are diagrams illustrating an anchor device according to an exemplary embodiment of the present disclosure when an attachment pin is disposed at a retained position in a plate body, FIG. 5A being a front face view, and FIG. 5B being a cross-section sectioned along line 5B-5B in FIG. 5A.
Figure 5B:
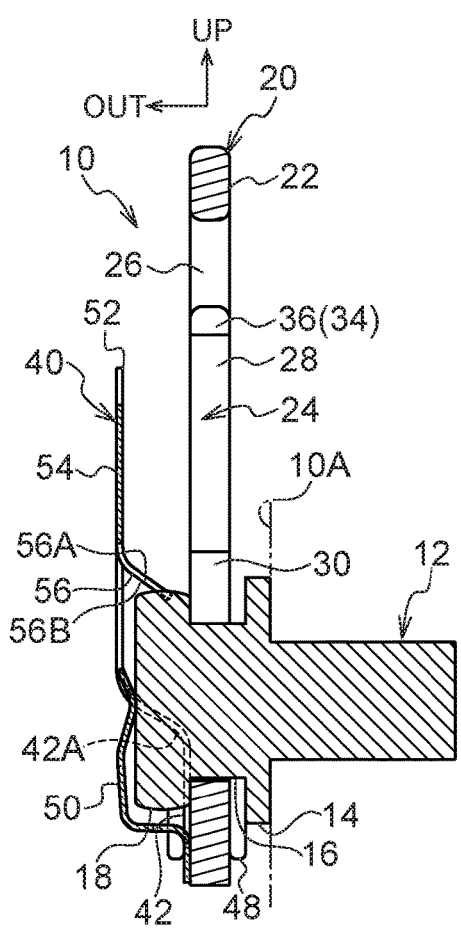

FIG. 1 is an exploded perspective view illustrating an anchor device 10 according to an exemplary embodiment of the present disclosure. FIG. 5A is a front face view illustrating the anchor device 10, and FIG. 5B is a cross-section illustrating the anchor device 10 as sectioned along line 5B-5B in FIG. 5A. In the drawings, the arrow FR indicates a front side, the arrow OUT indicates a vehicle width direction outside, and the arrow UP indicates an upper side of a vehicle applied with the anchor device 10.

As illustrated in FIG. 1, FIG. 5A, and FIG. 5B, the anchor device 10 includes an attachment pin (anchor pin) 12 serving as a second member. The attachment pin 12 is for example formed entirely of a metal such as a ferrous metal, and is disposed at a vehicle lower side location at the vehicle width direction outside of a seat cushion of a front seat (not illustrated in the drawings).

A vehicle width direction outside portion of the attachment pin 12 includes a base portion 14 serving as a base, a small diameter portion 16 serving as a shaft, and a large diameter portion 18 serving as a head. The base portion 14 is formed in a circular plate shape (or a circular column shape), and an axial center direction of the base portion 14 runs along the vehicle width direction. A portion of the attachment pin 12 at the vehicle width direction inside of the base portion 14 is fixed (coupled) to a vehicle body 10A such as a frame configuring the seat cushion of the front seat, such that the base portion 14 is integral to the vehicle body 10A.

The small diameter portion 16 is provided at the vehicle width direction outside of the base portion 14. The small diameter portion 16 has a circular column shape, and an external diameter dimension of the small diameter portion 16 is smaller than an external diameter dimension of the base portion 14. An axial center direction of the small diameter portion 16 runs along the vehicle width direction, and the small diameter portion 16 is disposed coaxially to the base portion 14. A vehicle width direction inside end of the small diameter portion 16 is linked to a vehicle width direction outside end of the base portion 14, such that the small diameter portion 16 is integral to the base portion 14.

The large diameter portion 18 is provided at the vehicle width direction outside of the small diameter portion 16. The large diameter portion 18 has a circular column shape (or a circular plate shape), and an external diameter dimension of the large diameter portion 18 is larger than the external diameter dimension of the small diameter portion 16. An axial center direction of the large diameter portion 18 runs along the vehicle width direction, the large diameter portion 18 is disposed coaxially to the small diameter portion 16, and an outer peripheral face of the large diameter portion 18 is curved in a convex shape along the vehicle width direction (axial direction). A vehicle width direction inside end of the large diameter portion 18 is linked to a vehicle width direction outside end of the small diameter portion 16, such that the large diameter portion 18 is integral to the small diameter portion 16.

As illustrated in FIG. 1, FIG. 2A, FIG. 2B, FIG. 5A, and FIG. 5B, the anchor device 10 includes a plate 20 (anchor plate) serving as a first member. The plate 20 includes a plate body 22. The plate body 22 is formed entirely of a metal such as a ferrous metal and has a substantially rectangular plate shape. A thickness dimension (vehicle width direction dimension) of the plate body 22 is smaller than an axial direction dimension of the small diameter portion 16 of the attachment pin 12. In the present exemplary embodiment, a width direction of the plate body 22 runs along a vehicle front-rear direction, and a length direction of the plate body 22 runs along a vehicle up-down direction.

A webbing insertion portion 26 serving as a coupling portion, and a communication hole 24 serving as a through-hole are formed in the plate body 22. The communication hole 24 is configured by a pin insertion portion 28 serving as an insertion portion and a pin anchor portion 30 serving as a retaining portion.

The webbing insertion portion 26 is disposed at a vehicle upper side portion of the plate body 22. The webbing insertion portion 26 is an elongated hole with its length along the vehicle front-rear direction (the width direction of the plate body 22), and penetrates the plate body 22 in the thickness direction of the plate body 22.

A length direction leading end portion of elongated belt shaped webbing 32 is passed though the inside of the webbing insertion portion 26. The webbing 32 configures a seatbelt device together with the anchor device 10. After passing from the vehicle upper side of the webbing insertion portion 26 and through the inside of the webbing insertion portion 26, the length direction leading end portion of the webbing 32 is folded back toward the vehicle upper side. A portion of the webbing 32 further toward the length direction leading end side than the folded-back portion and a portion of the webbing 32 further toward a length direction base end side than the folded-back portion are superimposed on each other in the thickness direction of the webbing 32, and the portion of the webbing 32 further toward the length direction leading end side than the folded-back portion is fixed to the portion of the webbing 32 further toward the length direction base end side of the folded-back portion by stitching or the like. The length direction leading end portion of the webbing 32 is thereby anchored (coupled) to the plate 20.

The seatbelt device includes a buckle (not illustrated in the drawings). The buckle is provided at the vehicle width direction inside of the front seat. In a state in which an occupant is seated in a sitting position in the front seat, the webbing 32 is pulled out from a spool of a webbing take-up device and pulled across the body of the occupant, and a tongue (not illustrated in the drawings) provided to the webbing 32 is engaged with the buckle in this state. This enables the body of the occupant to be restrained by the webbing 32 in a state in which the webbing 32 has been fitted over the body of the occupant.

The pin insertion portion 28 is formed penetrating the plate body 22 at the vehicle lower side of the webbing insertion portion 26. The pin insertion portion 28 joins up with the webbing insertion portion 26, such that the webbing insertion portion 26 is in communication with the communication hole 24. An inner peripheral profile of the pin insertion portion 28 is larger than an outer peripheral profile of the large diameter portion 18 of the attachment pin 12. This enables the large diameter portion 18 of the attachment pin 12 to be inserted into the pin insertion portion 28 from the vehicle width direction inside of the plate body 22 such that the small diameter portion 16 of the attachment pin 12 is disposed inside the pin insertion portion 28 (corresponding to an inserted position) (see FIG. 3A and FIG. 3B).

The pin anchor portion 30 that together with the pin insertion portion 28 configures the communication hole 24 is formed penetrating the plate body 22 at the vehicle lower side of the pin insertion portion 28. The pin anchor portion 30 extends along the vehicle up-down direction and joins up with the pin insertion portion 28. A vehicle lower side end portion of the pin anchor portion 30 is formed with a semicircular profile in front face view. A vehicle front-rear direction dimension (width dimension) of the pin anchor portion 30 is slightly larger than the external diameter dimension of the small diameter portion 16 of the attachment pin 12, but is smaller than the respective external diameter dimensions of the base portion 14 and the large diameter portion 18 of the attachment pin 12. An internal diameter of a vehicle lower side portion of the pin anchor portion 30 is slightly larger than the external diameter of the small diameter portion 16 of the attachment pin 12.

Thus, in a state in which the small diameter portion 16 of the attachment pin 12 has been disposed inside the pin insertion portion 28, moving (sliding) the plate body 22 toward the vehicle upper side enables the small diameter portion 16 to be moved (to slide) into the pin anchor portion 30, such that the small diameter portion 16 is fitted together with the vehicle lower side portion of the pin anchor portion 30 and is disposed in a retained position (a fitted position). Thus, a vehicle width direction outside face of the base portion 14 of the attachment pin 12 opposes a vehicle width direction inside face of the plate body 22 on one side of the pin anchor portion 30, and a vehicle width direction inside face of the large diameter portion 18 of the attachment pin 12 opposes a vehicle width direction outside face of the plate body 22 on the other side of the pin anchor portion 30. Furthermore, movement of the plate body 22 toward the vehicle upper side is restricted by the attachment pin 12.

Note that in the present exemplary embodiment, a semi-retained position (a semi-fitted position) of the attachment pin 12 with respect to the plate body 22 (see FIG. 4A and FIG. 4B) is configured spanning from the inserted position where the attachment pin 12 is inserted into the pin insertion portion 28 of the plate body 22 to the retained position (but not including the inserted position and the retained position).

A narrowed portion 34, configuring a restricting portion, is provided to the plate body 22. The narrowed portion 34 includes a pair of projections 36. The pair of projections 36 extend in directions approaching each other from both sides of a peripheral edge portion of the communication hole 24 (both width direction sides of the plate body 22), and are located between the webbing insertion portion 26 and the pin insertion portion 28. A dimension of a gap between leading ends of the pair of projections 36 is smaller than the external diameter dimension of the small diameter portion 16 of the attachment pin 12.

The width of the communication hole 24 at a communication location between the webbing insertion portion 26 and the pin insertion portion 28 is thereby narrowed by the pair of projections 36. Thus, in the plate body 22, the webbing 32 is suppressed from encroaching into the pin insertion portion 28 and the attachment pin 12 is restricted from encroaching into the webbing insertion portion 26, thereby suppressing contact between the webbing 32 and the attachment pin 12.

Attachment holes 22A are formed penetrating both vehicle front-rear direction side portions of a vehicle lower side end portion of the plate body 22.

A spring plate 40, serving as a biasing member (biasing portion) configuring a retaining portion, is provided at the vehicle width direction outside of the plate body 22. The spring plate 40 is made of metal and has a substantially rectangular framed plate shape. A vehicle front-rear direction dimension of the spring plate 40 is slightly smaller than a vehicle front-rear direction dimension of the plate body 22.

Leg portions 42 are formed at both vehicle front-rear direction side portions of a vehicle lower side portion of the spring plate 40. A fixing hole 46 is formed penetrating a vehicle lower side portion of each of the leg portions 42. Rivets 48 are inserted into the fixing holes 46 and into the corresponding attachment holes 22A in the plate body 22, such that the spring plate 40 is fixed to the plate body 22 by the rivets 48. Upright portions 42A, serving as elastic portions, are formed at vehicle upper side portions of the respective leg portions 42. The upright portions 42A are inclined in a direction toward the vehicle width direction outside on progression toward the vehicle upper side.

A biasing portion 50 with a substantially L-shaped cross-section is integrally formed inside the vehicle lower side portion of the spring plate 40. A vehicle lower side portion of the biasing portion 50 extends toward the vehicle width direction outside from a vehicle front-rear direction central portion of the vehicle lower side portion of the spring plate 40. A vehicle upper side portion of the biasing portion 50 extends toward the vehicle upper side. A vehicle upper side end portion of the biasing portion 50 is enlarged toward both vehicle front-rear direction sides and is curved in a convex shape protruding toward the vehicle width direction inside with respect to the vehicle up-down direction.

A vehicle upper side end portion of the biasing portion 50 is pressed toward the vehicle width direction outside by a vehicle width direction outside face of the large diameter portion 18 of the attachment pin 12, such that the vehicle lower side portion of the biasing portion 50 in particular undergoes elastic deformation and elastically tilts toward the vehicle width direction outside. The large diameter portion 18 is thus pinched between the vehicle upper side end portion of the biasing portion 50 and the plate body 22 by the biasing force of the biasing portion 50, such that the vehicle width direction outside face of the plate body 22 is press-contacted by the vehicle width direction inside face of the large diameter portion 18, and movement of the plate body 22 in the vehicle width direction is restricted.

A section of the spring plate 40 at the vehicle upper side of the upright portions 42A configures a body section 52, serving as a tiltable location. The body section 52 is disposed at the vehicle width direction outside with respect to the vehicle lower side portions of the leg portions 42.

A substantially rectangular plate shaped tiltable tab 54, serving as a tiltable portion, is integrally formed inside a vehicle upper side portion of the body section 52. The tiltable tab 54 extends toward the vehicle lower side from a vehicle front-rear direction central portion of the vehicle upper side portion of the body section 52. A pin restricting portion 56, serving as an abutting location, is formed to a vehicle lower side end portion (leading end portion) of the tiltable tab 54. The pin restricting portion 56 extends in a direction toward the vehicle width direction inside on progression toward the vehicle lower side.

A triangular dividing hole 56A is formed penetrating a vehicle front-rear direction central portion of the pin restricting portion 56. A vehicle front-rear direction dimension of the dividing hole 56A increases on progression along the extension direction of the pin restricting portion 56 (on progression toward the vehicle lower side and vehicle width direction inside). The dividing hole 56A is open in the extension direction of the pin restricting portion 56. The dividing hole 56A divides the pin restricting portion 56 into divided plates 56B, serving as abutting portions, at the vehicle front side and vehicle rear side. Each of the divided plates 56B has a trapezoidal plate shape. An end portion on the dividing hole 56A side of each of the divided plates 56B (toward the vehicle front-rear direction inside of the pin restricting portion 56) is inclined in a direction toward the vehicle front-rear direction outside of the pin restricting portion 56 on progression along the extension direction of the pin restricting portion 56.

By disposing the large diameter portion 18 of the attachment pin 12 at the vehicle lower side of the pin restricting portion 56 (the pair of divided plates 56B) and using the large diameter portion 18 to restrict movement of the pin restricting portion 56 toward the vehicle lower side, movement of the plate 20 (the plate body 22 and the spring plate 40) toward the vehicle lower side is restricted, such that the attachment pin 12 is retained by the plate 20. Moreover the large diameter portion 18 enters between the divided plates 56B (into the dividing hole 56A), such that the large diameter portion 18 is disposed on the dividing hole 56A side of the divided plates 56B (at the vehicle front-rear direction inside of the pin restricting portion 56).

Explanation follows regarding operation of the present exemplary embodiment.

Figure 2A:
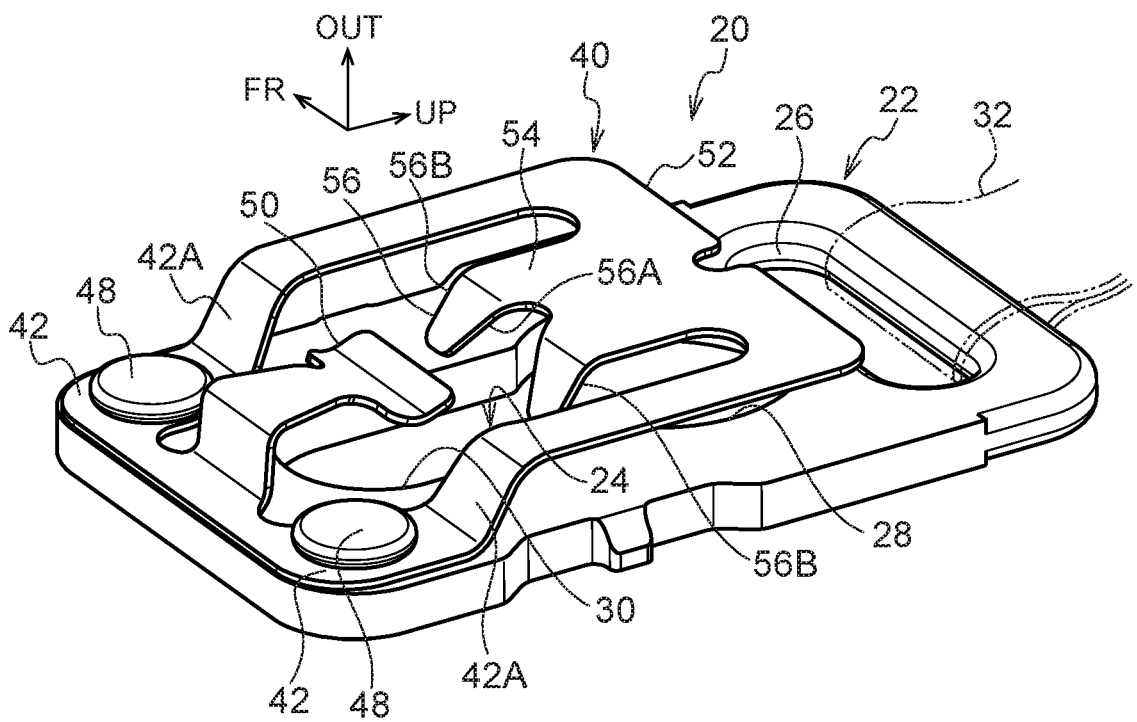
FIG. 2A and FIG. 2B are diagrams illustrating a plate of an anchor device according to an exemplary embodiment of the present disclosure, FIG. 2A being a front face perspective view, and FIG. 2B being a back face perspective view.
Figure 2B:
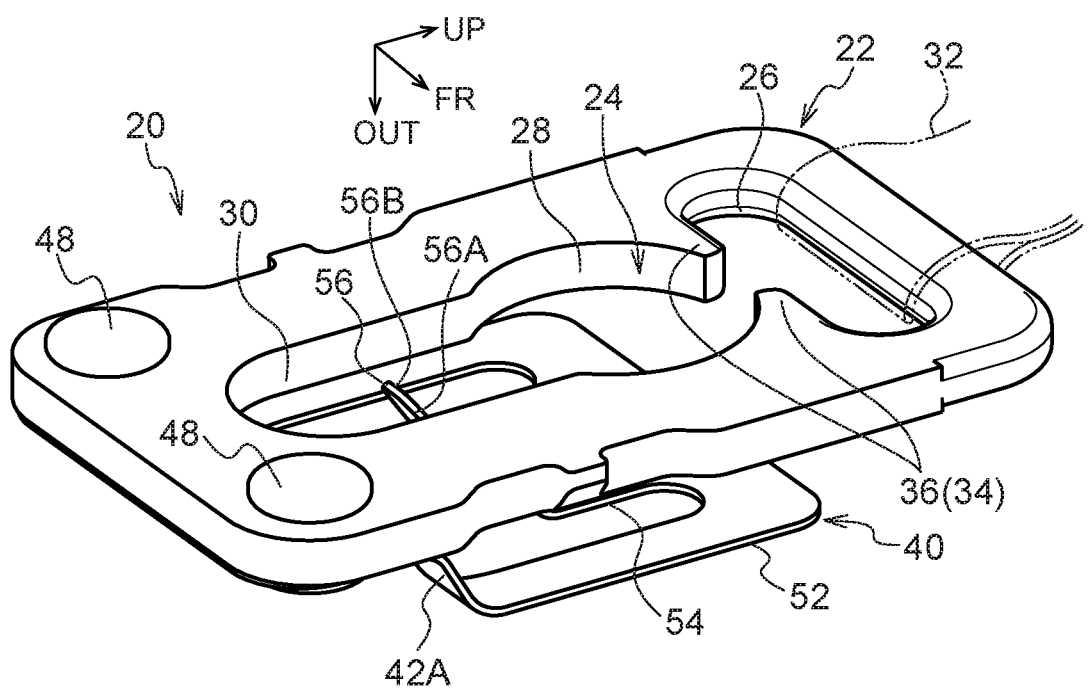

In the anchor device 10 with the above configuration, during attachment of the plate 20 (the plate body 22 and the spring plate 40) to the attachment pin 12 of the vehicle body 10A, the webbing 32 is coupled to the plate body 22 (see FIG. 2A and FIG. 2B).

The attachment pin 12 is then passed through the pin insertion portion 28 of the plate body 22 from the vehicle width direction inside, and the large diameter portion 18 of the attachment pin 12 is disposed at the vehicle width direction outside of the plate body 22 and at the vehicle upper side of the pin restricting portion 56 of the tiltable tab 54 of the spring plate 40, such that the small diameter portion 16 of the attachment pin 12 is disposed inside the pin insertion portion 28 so as to be disposed at the inserted position in the plate body 22 (see FIG. 3A and FIG. 3B).

Figure 4A:
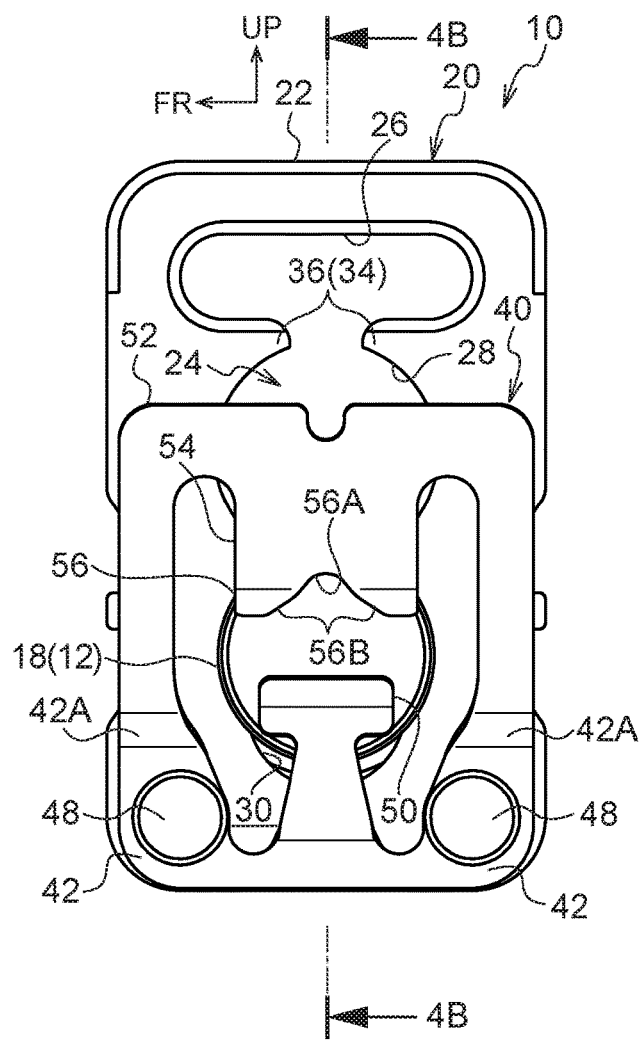
FIG. 4A and FIG. 4B are diagrams illustrating an anchor device according to an exemplary embodiment of the present disclosure when an attachment pin is disposed at a semi-retained position in a plate body, FIG. 4A being a front face view, and FIG. 4B being a cross-section sectioned along line 4B-4B in FIG. 4A.
Figure 4B:
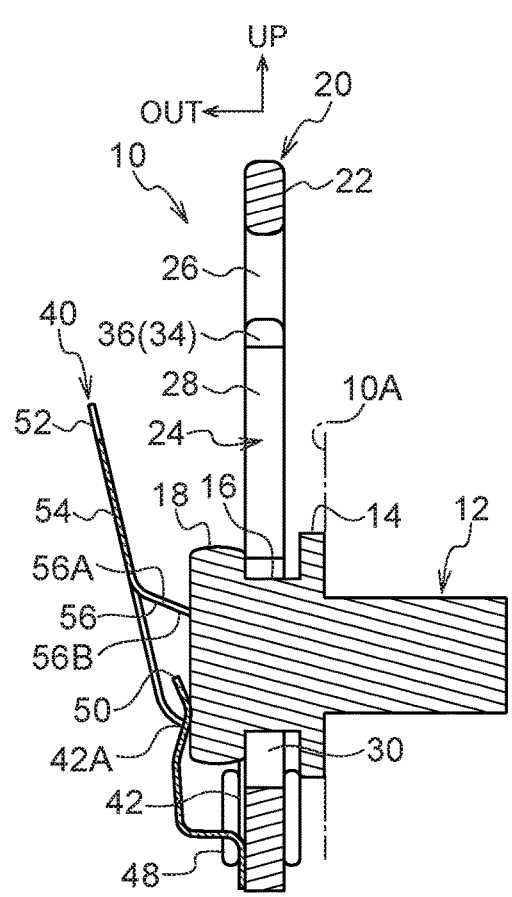

Then, by moving (sliding) the plate 20 toward the vehicle upper side such that the large diameter portion 18 of the attachment pin 12 moves along the vehicle width direction outside of the plate body 22 toward the vehicle lower side, the small diameter portion 16 of the attachment pin 12 is moved from inside the pin insertion portion 28 of the plate body 22 to inside the pin anchor portion 30, and is thus moved to the semi-retained position in the plate body 22 (see FIG. 4A and FIG. 4B).

Figure 6A:
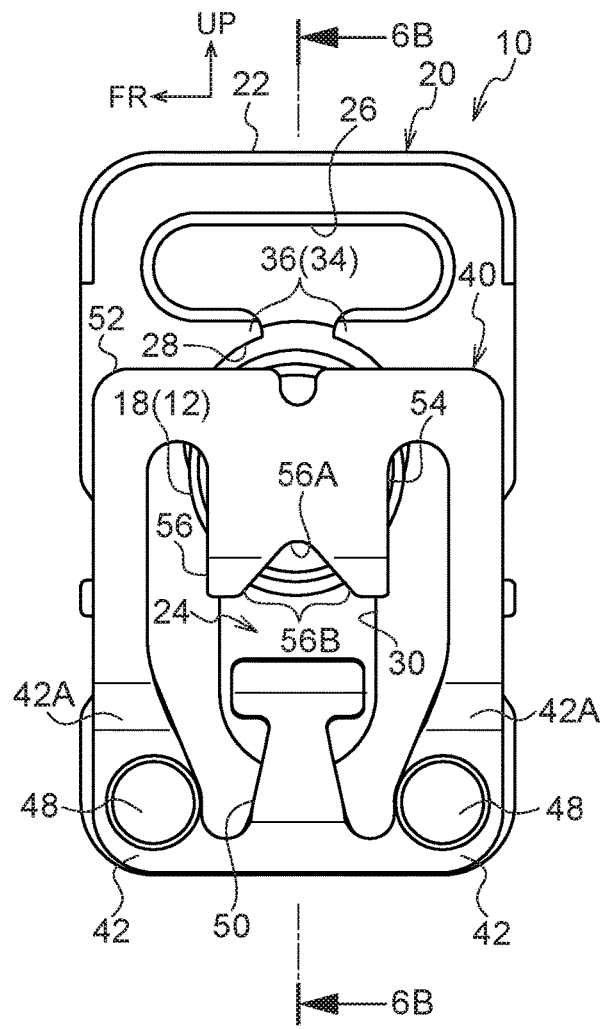
FIG. 6A and FIG. 6B are diagrams illustrating an anchor device according to an exemplary embodiment of the present disclosure when an attachment pin is being moved to a semi-retained position in a plate body, FIG. 6A being a front face view, and FIG. 6B being a cross-section sectioned along line 6B-6B in FIG. 6A.
Figure 6B:
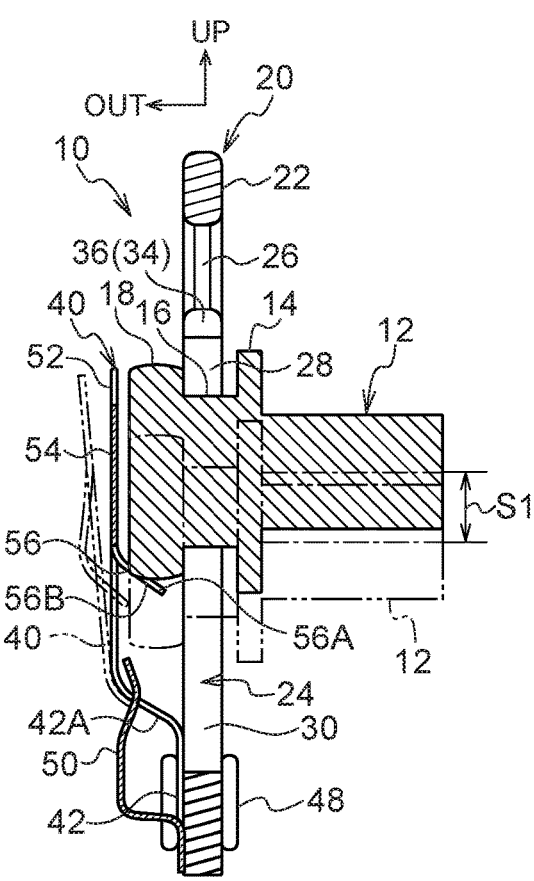

When this is performed, the pin restricting portion 56 (the pair of divided plates 56B) of the tiltable tab 54 of the spring plate 40 abut the outer peripheral face of the large diameter portion 18 of the attachment pin 12 from the vehicle lower side, such that the upright portions 42A of the spring plate 40 in particular undergo elastic deformation, and the body section 52 (including the tiltable tab 54) of the spring plate 40 is elastically tilted toward the vehicle width direction outside. Furthermore, a vehicle upper side portion of the tiltable tab 54 in particular undergoes elastic deformation, and the tiltable tab 54 elastically tilts toward the vehicle width direction outside such that the pin restricting portion 56 rides up onto the vehicle width direction outside face of the large diameter portion 18 (see FIG. 6A and FIG. 6B). Once the pin restricting portion 56 has ridden up onto the vehicle width direction outside face of the large diameter portion 18, the vehicle upper side portion of the tiltable tab 54 in particular undergoes elastic recovery and the elastic tilting of the tiltable tab 54 is released, such that the upright portions 42A of the spring plate 40 in particular undergo further elastic deformation, and the body section 52 of the spring plate 40 is further elastically tilted toward the vehicle width direction outside. Furthermore, the vehicle upper side end portion of the biasing portion 50 of the spring plate 40 abuts the outer peripheral face of the large diameter portion 18 of the attachment pin 12 from the vehicle lower side, and the vehicle lower side portion of the biasing portion 50 in particular undergoes elastic deformation, such that the biasing portion 50 is elastically tilted toward the vehicle width direction outside, and the vehicle upper side end portion of the biasing portion 50 rides up onto the vehicle width direction outside face of the large diameter portion 18.

By then moving the plate 20 further toward the vehicle upper side such that the large diameter portion 18 of the attachment pin 12 moves further toward the vehicle lower side along the vehicle width direction outside of the plate body 22, the small diameter portion 16 of the attachment pin 12 is fitted together with the vehicle lower side portion of the pin anchor portion 30 of the plate body 22 and is disposed at the retained position in the plate body 22 (see FIG. 5A and FIG. 5B).

When this occurs, the pin restricting portion 56 (the pair of divided plates 56B) of the tiltable tab 54 of the spring plate 40 passes over the vehicle upper side of the large diameter portion 18 of the attachment pin 12, such that the upright portions 42A of the spring plate 40 in particular undergo elastic recovery, and the elastic tilting of the body section 52 (including the tiltable tab 54) of the spring plate 40 is released. The pin restricting portion 56 is thus disposed at the vehicle upper side of the large diameter portion 18 and the large diameter portion 18 restricts movement of the pin restricting portion 56 toward the vehicle lower side, such that the plate 20 is attached to the attachment pin 12 and movement of the plate 20 toward the vehicle lower side is restricted.

When the small diameter portion 16 of the attachment pin 12 is moved relatively toward the vehicle lower side from the semi-retained position in the plate body 22 such that the pin restricting portion 56 (the pair of divided plates 56B) of the tiltable tab 54 of the spring plate 40 ride up onto the vehicle width direction outside face of the large diameter portion 18 of the attachment pin 12, the end portions on the dividing hole 56A side of the divided plates 56B (on the vehicle front-rear direction inside of the pin restricting portion 56) abut the outer peripheral face of the large diameter portion 18 from a vehicle upper side portion toward a vehicle lower side portion.

Figure 9:
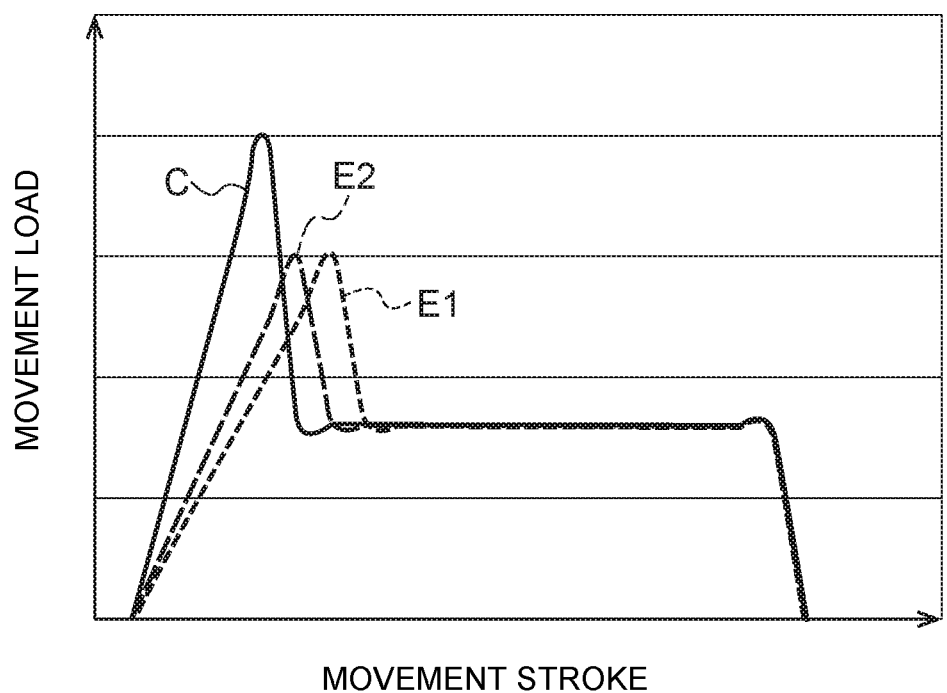
FIG. 9 is a graph illustrating a relationship between a movement stroke of an attachment pin with respect to a plate (horizontal axis) and movement load of the anchor pin with respect to the plate (vertical axis), in an anchor device (E1) according to an exemplary embodiment of the present disclosure, an anchor device (E2) according to a modified example of an exemplary embodiment of the present disclosure, and an anchor device (C) according to a comparative example.

Note that the end portions on the dividing hole 56A side of the divided plates 56B are inclined in a direction toward the opposite side to the dividing hole 56A (toward the vehicle front-rear direction outside of the pin restricting portion 56) on progression toward the vehicle lower side. Thus, as the pin restricting portion 56 rides up onto the vehicle width direction outside face of the large diameter portion 18 of the attachment pin 12, the position where the outer peripheral face of the large diameter portion 18 abuts the end portions on the dividing hole 56A side of the divided plates 56B is displaced toward the opposite side to the dividing hole 56A (a relative movement-width direction relative to the attachment pin 12) and toward the vehicle upper side (the opposite direction to the relative movement direction of the attachment pin 12). Thus, the positions where the divided plates 56B ride up onto the vehicle width direction outside face of the large diameter portion 18 are shifted toward the vehicle front-rear direction outsides with respect to the vehicle front-rear direction center of the large diameter portion 18, and are shifted toward the vehicle upper side with respect to a vehicle lower side end of the vehicle width direction outside face of the large diameter portion 18 (see FIG. 6A and FIG. 6B). This enables a vehicle up-down direction movement stroke S1 (see FIG. 6B) of the attachment pin 12 with respect to the plate 20 over which the pin restricting portion 56 rides up onto the vehicle width direction outside face of the large diameter portion 18 to be lengthened, thus enabling the maximum load required to cause the pin restricting portion 56 to ride up onto the vehicle width direction outside face of the large diameter portion 18 to be reduced. This also enables a rate of increase in the load required to cause the pin restricting portion 56 to ride up onto the vehicle width direction outside face of the large diameter portion 18 (the proportion by which the movement load of the attachment pin 12 with respect to the plate 20 increases against the movement stroke of the attachment pin 12 with respect to the plate 20) to be reduced (see E1 in FIG. 9). This enables the pin restricting portion 56 to easily ride up onto the vehicle width direction outside face of the large diameter portion 18, enabling the plate 20 to be easily attached to the attachment pin 12.

Furthermore, the divided plates 56B are provided on both vehicle front-rear direction (relative movement-width direction) sides of the attachment pin 12. Thus, the pair of divided plates 56B are able to suppress relative displacement of the attachment pin 12 in the vehicle front-rear direction as the pin restricting portion 56 rides up onto the vehicle width direction outside face of the large diameter portion 18 of the attachment pin 12, thereby enabling relative displacement of the plate 20 in the vehicle front-rear direction with respect to the attachment pin 12 to be suppressed. Moreover the action in which the pin restricting portion 56 rides up onto the vehicle width direction outside face of the large diameter portion 18 can be stabilized, enabling an attachment action of the plate 20 to the attachment pin 12 to be stabilized.

Moreover, when the small diameter portion 16 of the attachment pin 12 is disposed at the retained position in the plate body 22, the large diameter portion 18 of the attachment pin 12 enters between the divided plates 56B (into the dividing hole 56A) (the large diameter portion 18 is disposed on the dividing hole 56A side of the divided plates 56B (at the relative movement-width direction sides of the attachment pin 12)). This enables a vehicle up-down direction movement stroke S of the attachment pin 12 with respect to the plate 20 (movement stroke of the small diameter portion 16 from the inserted position to the retained position in the plate body 22, see FIG. 5A) to be shortened during attachment of the plate 20 to the attachment pin 12, enabling the plate 20 to be made smaller in size in the vehicle up-down direction, and thus enabling the anchor device 10 to be made smaller in size in the vehicle up-down direction. Moreover, the need to increase an incline angle of the pin restricting portion 56 with respect to the vehicle downward direction in order to reduce the vehicle up-down direction movement stroke S of the attachment pin 12 with respect to the plate 20 can be eliminated, thereby limiting any increase in the incline angle of the pin restricting portion 56 with respect to the vehicle downward direction, which would result in an increase in the load required to cause the pin restricting portion 56 to ride up onto the vehicle width direction outside face of the large diameter portion 18.

Modified Example

FIG. 7A is a front face view of an anchor device 70 according to a modified example of the above exemplary embodiment. FIG. 7B is cross-section of the anchor device 70 as sectioned along line 7B-7B in FIG. 7A.

The anchor device 70 according to the present modified example differs from the above exemplary embodiment in the following points.

As illustrated in FIG. 7A and FIG. 7B, in the anchor device 70 according to the present modified example, the dividing hole 56A of the pin restricting portion 56 of the tiltable tab 54 of the spring plate 40 is formed in a substantially semicircular shape, and the end portions on the dividing hole 56A sides of the divided plates 56B of the pin restricting portion 56 (toward the vehicle front-rear direction inside of the pin restricting portion 56) are curved in convex shapes protruding toward the opposite sides to the dividing hole 56A (toward the vehicle front-rear direction outsides of the pin restricting portion 56).

The present modified example is capable of exhibiting similar operation and advantageous effects to those of the above exemplary embodiment.

In particular, when the small diameter portion 16 of the attachment pin 12 is moved relatively toward the vehicle lower side past the semi-retained position in the plate body 22, and the pin restricting portion 56 of the tiltable tab 54 of the spring plate 40 rides up onto the vehicle width direction outside face of the large diameter portion 18 of the attachment pin 12, the positions of the outer peripheral face of the large diameter portion 18 that abut the end portions on the dividing hole 56A side of the divided plates 56B are displaced so as to be slightly shorter on the opposite sides to the dividing hole 56A, and at the vehicle upper side of those in the above exemplary embodiment. This enables a vehicle up-down direction movement stroke S2 (see FIG. 7B) of the attachment pin 12 with respect to the plate 20 over which the pin restricting portion 56 rides up onto the vehicle width direction outside face of the large diameter portion 18 to be lengthened, thus enabling the maximum load required to cause the pin restricting portion 56 to ride up onto the vehicle width direction outside face of the large diameter portion 18 to be reduced. This also enables a rate of increase of the load required to cause the pin restricting portion 56 to ride up onto the vehicle width direction outside face of the large diameter portion 18 (the proportion by which the movement load of the attachment pin 12 with respect to the plate 20 increases against the movement stroke of the attachment pin 12 with respect to the plate 20) to be reduced (see E2 in FIG. 9).

Moreover, when the small diameter portion 16 of the attachment pin 12 is disposed at the retained position in the plate body 22, a greater length of the large diameter portion 18 of the attachment pin 12 is located between the divided plates 56B (in the dividing hole 56A) than in the above exemplary embodiment. This enables the vehicle up-down direction movement stroke of the attachment pin 12 with respect to the plate 20 (the movement stroke of the small diameter portion 16 from the inserted position to the retained position in the plate body 22) during attachment of the plate 20 to the attachment pin 12 to be shortened.

Comparative Example

FIG. 8A is a front face view of an anchor device 100 according to a comparative example. FIG. 8B is cross-section of the anchor device 100 as sectioned along line 8B-8B in FIG. 8A.

The anchor device 100 according to the comparative example differs from the above exemplary embodiment and the modified example in the following points.

As illustrated in FIG. 8A and FIG. 8B, in the tiltable tab 54 of the spring plate 40 of the anchor device 100 according to the comparative example, the dividing hole 56A is not provided to the pin restricting portion 56, and the pin restricting portion 56 is not divided into the pair of divided plates 56B.

In the comparative example, when the small diameter portion 16 of the attachment pin 12 is moved relatively toward the vehicle lower side past the semi-retained position in the plate body 22, and the pin restricting portion 56 of the tiltable tab 54 of the spring plate 40 rides up onto the vehicle width direction outside face of the large diameter portion 18 of the attachment pin 12, the position of the outer peripheral face of the large diameter portion 18 that abuts the pin restricting portion 56 is not displaced in the vehicle front-rear direction and the position where the pin restricting portion 56 rides up onto the vehicle width direction outside face of the large diameter portion 18 is located at a vehicle lower side end of the vehicle front-rear direction center of the large diameter portion 18. Thus, a vehicle up-down direction movement stroke S3 (see FIG. 8B) of the attachment pin 12 with respect to the plate 20 over which the pin restricting portion 56 rides up onto the vehicle width direction outside face of the large diameter portion 18 cannot be lengthened, and the maximum load required to cause the pin restricting portion 56 to ride up onto the vehicle width direction outside face of the large diameter portion 18 cannot be reduced. Moreover, a rate of increase of the load required to cause the pin restricting portion 56 to ride up onto the vehicle width direction outside face of the large diameter portion 18 (the proportion by which the movement load of the attachment pin 12 with respect to the plate 20 increases against the movement stroke of the attachment pin 12 with respect to the plate 20) cannot be reduced (see C in FIG. 9).

Note that in the above exemplary embodiment and modified example, two of the divided plates 56B are provided to the pin restricting portion 56 of the tiltable tab 54 of the spring plate 40. However, configuration may be such that just one divided plate 56B is provided to the pin restricting portion 56 of the tiltable tab 54 of the spring plate 40.

In the above exemplary embodiment and modified example, the webbing 32 is coupled to the plate 20 (the plate body 22) and the attachment pin 12 is coupled to the vehicle body 10A. However, a configuration may be applied in which the webbing 32 is coupled to the attachment pin 12 and the plate 20 (the plate body 22) is coupled to the vehicle body 10A. Moreover, the webbing 32 may be coupled to the plate 20 (the plate body 22) or the attachment pin 12 through a tongue and buckle.

In the above exemplary embodiment and modified example, the anchor devices 10, 70 are each applied to the seatbelt device of a front seat of the vehicle. However, the anchor devices 10, 70 may be applied to a seatbelt device of any seat (such as a seatbelt device of a rear seat) in a vehicle.

What is claimed is:

1. An anchor device comprising:
   a first member that is coupled to one out of a vehicle body side or a webbing side;
   a second member that is coupled to the other out of the vehicle body side or the webbing side, and that is retained by the first member by being passed through the first member and being moved with respect to the first member; and
   an abutting portion that is provided to the first member and is configured to ride up onto the second member with a position where the second member abuts the abutting portion displaced in a movement-width direction of the second member and in the opposite direction to a movement direction of the second member when the second member is moved with respect to the first member,
   wherein the abutting portion includes a pair of divided plates having distal end portions that are not coupled to one another.

2. The anchor device of claim 1, wherein the abutting portion is provided on both movement-width direction sides of the second member.

3. The anchor device of claim 1, wherein the abutting portion is disposed at a side of the second member in the movement-width direction of the second member when the second member is retained by the first member.

4. The anchor device of claim 2, wherein the abutting portion is disposed at a side of the second member in the movement-width direction of the second member when the second member is retained by the first member.

5. An anchor device comprising:
   a first member that is coupled to one out of a vehicle body side or a webbing side;
   a second member that is coupled to the other out of the vehicle body side or the webbing side, and that is retained by the first member by being passed through the first member and being moved with respect to the first member; and
   an abutting portion that is provided to the first member and is configured to ride up onto the second member with a position where the second member abuts the abutting portion displaced toward a movement-width direction outer side of the second member and in the opposite direction to a movement direction of the second member when the second member is moved with respect to the first member.

6. The anchor device of claim 5, wherein the abutting portion is a pair of divided plates divided by a dividing hole on one side, and end portions on the dividing hole side of the divided plates are inclined in a direction toward the opposite side to the dividing hole on progression toward the vehicle lower side.

7. The anchor device of claim 5, wherein the abutting portion is provided on both movement-width direction sides of the second member.

8. The anchor device of claim 7, wherein the abutting portion is disposed at a side of the second member in the movement-width direction of the second member when the second member is retained by the first member.

9. The anchor device of claim 5, wherein the abutting portion is disposed at a side of the second member in the movement-width direction of the second member when the second member is retained by the first member.

10. An anchor device comprising:
    a first member that is coupled to one out of a vehicle body side or a webbing side;

a second member that is coupled to the other out of the vehicle body side or the webbing side, and that is retained by the first member by being passed through the first member and being moved with respect to the first member; and an abutting portion that is provided to the first member and is configured to ride up onto the second member with a position where the second member abuts the abutting portion displaced in a movement-width direction of the second member and in the opposite direction to a movement direction of the second member when the second member is moved with respect to the first member, wherein the abutting portion includes a pair of divided plates divided by a dividing hole, and the divided plates are provided on a member that restricts movement of the second member in a vehicle upward direction.

11. The anchor device of claim 10, wherein the abutting portion is provided on both movement-width direction sides of the second member.

12. The anchor device of claim 10, wherein the abutting portion is disposed at a side of the second member in the movement-width direction of the second member when the second member is retained by the first member.

13. The anchor device of claim 11, wherein the abutting portion is disposed at a side of the second member in the movement-width direction of the second member when the second member is retained by the first member.

* * * * *